United States Patent [19]
Kattner

[11] 3,795,364
[45] Mar. 5, 1974

[54] APPARATUS FOR APPLYING HIGH VISCOSITY MIXTURE OF REACTIVE COMPONENTS

[75] Inventor: Ronald D. Kattner, North Canton, Ohio

[73] Assignee: The General Tire & Rubber Company, Akron, Ohio

[22] Filed: May 25, 1973

[21] Appl. No.: 356,004

[52] U.S. Cl.................. 239/8, 239/400, 239/416.1, 239/432
[51] Int. Cl. ........................ A01n 17/02, A62c 1/12
[58] Field of Search ............ 239/8, 400, 416.1, 432

[56] References Cited
UNITED STATES PATENTS
| | | | |
|---|---|---|---|
| 1,142,623 | 6/1915 | Regenbogen | 239/432 |
| 3,306,540 | 2/1967 | Reichert | 239/432 |
| 3,759,450 | 9/1973 | Fram et al. | 239/432 |

*Primary Examiner*—Lloyd L. King

[57] ABSTRACT

A greatly simplified apparatus for mixing and dispensing a high viscosity mixture of reactive components, such as the components of a urethane-based adhesive. The apparatus consists essentially of an elongated hollow member having an input end and an output end, the member defining a mixing chamber and terminating in a nozzle at its output end. A mixing means is located within the hollow member and acts in cooperation therewith such that, after the first and second reactive components pass through the hollow member under pressure, the reactive components comprise a generally homogeneous mixture. A body member is fixedly mounted to the input end of the hollow member and is adapted to have a plurality of valves mounted thereto. There is a first valve and a second valve mounted on the body member, the first valve having an inlet and a pressurized source of the first reactive component connected thereto, the second valve having an inlet and a pressurized source of the second reactive component connected thereto. Each of the valves has an outlet in permanent, open communication with the mixing chamber by means of a passageway through the body member such that during intermittent stopping and starting of the flow of the components and the mixture, a smooth-walled, continuous flow path is presented to the materials, thus greatly reducing the possibility of build-up of hardened materials within the gun.

14 Claims, 5 Drawing Figures

APPARATUS FOR APPLYING HIGH VISCOSITY MIXTURE OF REACTIVE COMPONENTS

BACKGROUND OF THE DISCLOSURE

1. Field of the Invention

This invention relates to the mixing and application of several reactive components, and more particularly, to an apparatus for mixing and dispensing high viscosity materials such as polymeric resins.

While the present invention is equally useful for mixing and applying any high viscosity materials, it is especially advantageous when used to mix the components of urethane-based adhesives, and will be discussed in connection therewith. The availability of polymeric adhesives has played an important role in the development of markets for fiber-reinforced plastic (FRP) materials, because FRP parts can be readily and permanently bonded to each other or to other materials by polymeric adhesives, and especially the urethane-based adhesives. Such adhesives have also been used successfully to bond parts made of steel, aluminum, other plastics and even wood, to another part of either similar or dissimilar material.

The selection of urethane-based adhesives over other adhesives is based partly on their outstanding characteristics with respect to bond strength, chemical inertness, tensile strength and handling.

2. Description of the Prior Art

Although the use of the conventional urethane-based adhesives is generally advantageous, one problem which has arisen is that, although highly viscous, they tend to run off or drip down inclined or overhead surfaces prior to solidification. This of course results in bare spots where no bonding occurs and impairs the ultimate strength of the bond.

This problem has resulted in the development of improved urethane adhesives which substantially eliminate the run-off problems, but which are even more viscous, frequently reaching a viscosity of about 100,000 cps. or more immediately after the components are mixed. See, for example, U.S. Pat. No. 3,714,127 assigned to The General Tire & Rubber Co.

The typical prior art apparatus for mixing and dispensing such materials (generally referred to as "mixing guns") was primarily adapted for applying or spraying liquid adhesives, and other resinous materials generally in the viscosity range of about 2,000 to about 10,000 cps.

Much of the prior art in regard to mixing guns actually relates to spray guns which rely for their operation on high pressure air to expel the mixed liquid components in atomized or droplet form, such as U.S. Pat. Nos. 3,035,775 and 3,122,322. It is apparent that such spray devices would not be operable for mixing and applying a high viscosity material such as an adhesive, having approximately the consistency and flowability of toothpaste. In addition, during mixing of the components of a urethane-based adhesive, the presence of air in the mixing chamber cannot be tolerated, because the air and the moisture in the air ruin the mixture physically by foaming it, thus making the mixture unsuitable for subsequent application as an adhesive.

The prior art also shows mixing guns which do not use an air spray and hence are referred to as airless mixing guns. Some airless guns, such as is shown in U.S. Pat. No. 2,890,836, do not include a mixing device, relying instead on a vortex flow of the components for complete mixing, and their use is therefore limited to liquids or components of extremely low viscosity. In many other airless mixing guns, the flow path of one or more of the components passes through such elements as: spring biased check valves (U.S. Pat. Nos. 3,123,306, 3,338,561, 3,417,923 and 3,437,273) valve cylinders with circumferential inlet and outlet ports, much smaller than the feed lines (U.S. Pat. No. 3,708,123), and various other arrangements of small passageways and miscellaneous impedances to the flow of the reactive components (U.S. Pat. Nos. 3,176,922, 3,116,878 and 3,304,010).

The complicated passageways and valve arrangements in the prior art mixing guns result in several serious operating problems when such guns are used for mixing high viscosity reactive components which tend to set-up or harden within a very short time. The major problem during operation is the tendency for the prior art mixing gun to form a build-up of either the adhesive or one of the reactive components which has hardened. The tendency to build-up is greatest around valves, springs, and other discontinuities in the flow path. A related problem is that after some of the adhesive or one of the components forms a hardened build-up within the mixing gun, particles of the hardened matter may break loose and become mixed-in with the fresh adhesive which is subsequently applied to form a bond. Previously cured particles of material in the fresh adhesive have the same effect as voids in the adhesive layer and the result is a point at which no bond occurs between the mating surfaces, and an overall weakening of the bond. Occasionally, especially in the guns in which either the components or the mixed adhesive must follow a relatively long flow path through the gun, the particular material may harden within the passageway, thus completely stopping the flow of that particular material. If a build-up occurs in the area of a discontinuity, such as a valve or spring, or if there is a restriction in the passageway caused by a hardening of some of the component, the result will be a reduction in the proportion of that particular component in the mixture, with a possible impairment of the bonding ability of the mixture.

Certain problems have arisen also in regard to maintaining the prior art mixing guns. It has been found to be quite difficult to clean or flush the complex prior art mixing gun. Flushing and cleaning are generally accomplished by means of a solvent such as methylene chloride. When the flow paths and passageways within the gun are relatively long and complex, the methylene chloride flush is frequently unable to adequately dissolve and remove the old material from the passageways of the gun because the flushing fluid has a tendency to "wear-out" before the entire gun is cleaned. With a typical prior art gun formerly used to apply a urethane-based adhesive, it has been found that, on the average, the gun may be operated for only about half a working shift before it must be completely disassembled and cleaned with methylene chloride. Because of the large number of valves, springs, O-rings and seals in this particular gun, the entire disassembly, cleaning and reassembly operation may take several hours. Thus, many extra guns are needed for the operation, and the maintenance costs greatly increase the overall cost of using such guns.

SUMMARY OF THE INVENTION

Accordingly, it is an object of the present invention to provide a mixing gun for use with high viscosity components which substantially eliminates the problems discussed above.

More specifically, it is an object of the present invention to provide a mixing gun in which the flow path of each of the reactive components, as well as of the mixed adhesive, is relatively short and has a minimum of obstructions and discontinuities which can cause the flowing material to plug the passageway or leave a partial build-up.

It is a further object of the present invention to provide a mixing gun which substantially eliminates all small, intricate parts which tend to obstruct the flow of material in the gun and provide a place for a build-up of hardened materials to form.

It is a related object of the present invention to provide a mixing gun in which there are no valves, along the path of any of the materials, which are operating while the flow of the material is intermittently stopping and starting.

It is also an object of the present invention to provide a mixing gun which can be readily cleaned by flushing with solvent, without disrupting the use of the gun, or necessitating disassembly of the gun, removal of lines or temporary connection of additional lines.

It is another object of the present invention to provide a mixing gun which can be quickly and easily disassembled, thoroughly cleaned and reassembled in a relatively short time and with little or no chance of a part being put back improperly.

These and other objects of the present invention, which will become apparent upon a reading of the following detailed description, are accomplished by the provision of apparatus for mixing a first reactive component and a second reactive component and applying the mixture. The apparatus consists essentially of:
  a. an elongated hollow member having an input end and an output end, the member defining a mixing chamber and terminating in a nozzle at its output end;
  b. mixing means located within the hollow member and acting in cooperation therewith such that, after the first and second reactive components pass through the hollow member under pressure, the reactive components comprise a generally homogeneous mixture;
  c. a body member fixedly mounted to the input end of the hollow member and adapted to have a plurality of valves mounted thereto;
  d. a first valve and a second valve mounted on the body member, the first valve having an inlet and a pressurized source of the first reactive component connected thereto, the second valve having an inlet and a pressurized source of the second reactive component connected thereto;
  e. each of the valves having an outlet in permanent, open communication with the mixing chamber, by means of a passageway through the body member.

In accordance with a further aspect of the present invention, the apparatus includes a third valve mounted on the body member, having an inlet and pressurized source of a solvent fluid connected thereto, the third valve having an outlet in permanent open communication with the mixing chamber, by means of a passageway through the body member, whereby the mixing chamber can be flushed with solvent fluid without disassembling any portion of the apparatus and without the necessity of temporarily attaching additional lines to the apparatus.

The objects of the present invention are further accomplished by the provision of an improvement in the method of mixing a first reactive component and a second reactive component and dispensing the resulting highly viscous polymer mixture, the method including pumping the first reactive component from a first storage container to the mixing gun, pumping the second reactive component from a second storage container to the mixing gun, admitting the first and second reactive components into the mixing gun, mixing the reactive components and dispensing the polymer mixture. The improvement comprises:
  a. providing a first connecting means such that the first storage container is in open communication with the mixing gun;
  b. providing a second connecting means such that the second storage container is in open communication with the mixing gun;
  c. simultaneously actuating the pumping means on the first storage container and the pumping means on the second storage container, thereby forcing the first and second reactive components directly into the mixing gun;
  d. simultaneously de-actuating the pumping means on the first storage container and the pumping means on the second storage container when the desired amount of the polymer mixture has been dispensed.

DESCRIPTION OF THE PREFERRED EMBODIMENT

Adhesive Gun

Figure 1:
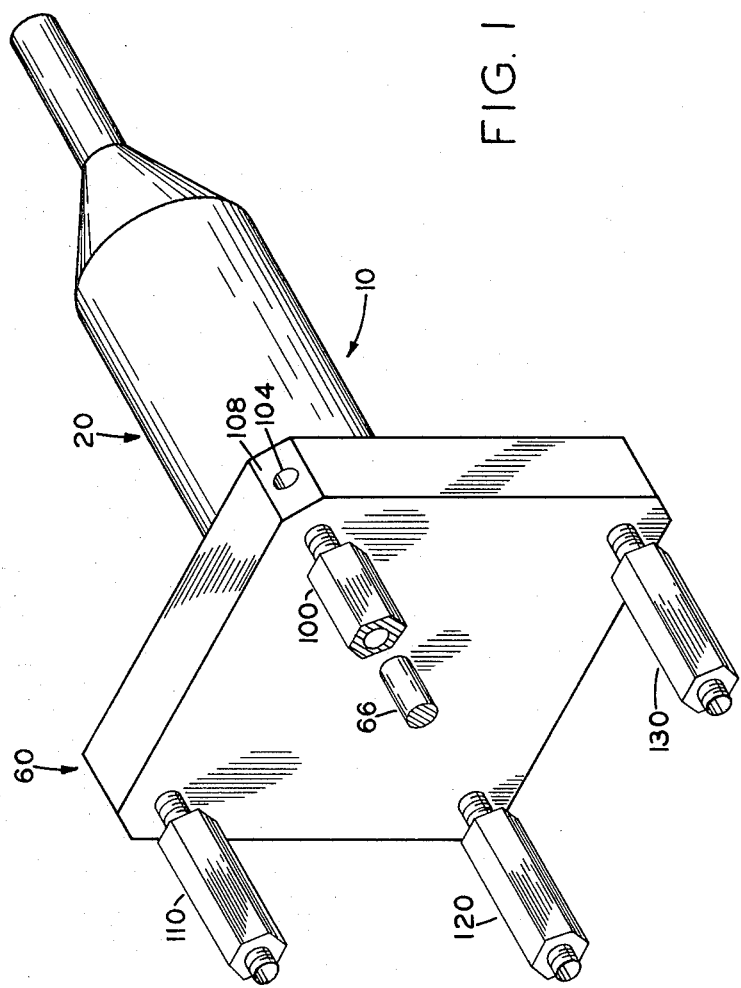
FIG. 1 is a perspective of the adhesive gun of the present invention, with all incoming lines removed.

Referring specifically to the drawings, which are for the purpose of illustrating the preferred embodiment of the present invention and not for limiting the same, FIG. 1 is a perspective in which the adhesive gun is designated generally by the numeral 10. The gun is divided generally into a chamber portion 20 and a body portion 60. The valves and auxiliary equipment will be described subsequently.

Figure 2:
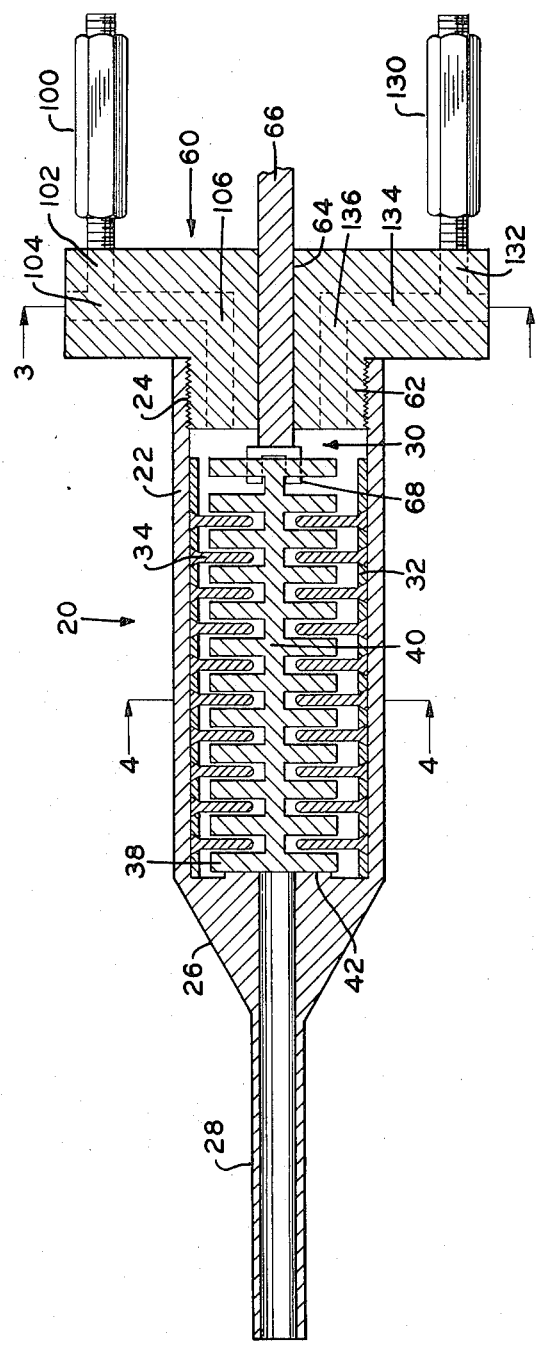
FIG. 2 is a cross-section of the present invention on approximately the same scale as FIG. 1.

Turning now to FIG. 2, which, in the subject embodiment is both a vertical section and a horizontal section of the adhesive gun, but will be treated subsequently as a vertical section, the simplicity of the design of the present invention is apparent.

Chamber portion 20 comprises a generally elongated, hollow member 22, which defines the mixing chamber. The member 22 has internal threads 24 at its input end such that the member 22 and the body portion 60 can be threadedly connected. Chamber portion 20 terminates at its output end in a portion 26, gradually tapering from the larger diameter of the member 22 to the relatively smaller nozzle-defining portion 28, through which the substantially homogeneous mixture of reactive components passes.

Figure 4:
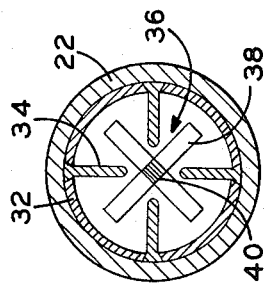
FIG. 4 is a cross-section taken on line 4—4 of FIG. 2.

Within the mixing chamber 30 is a mixing device which, in the subject embodiment, comprises a sleeve 32 with 4 longitudinal rows of radially-inwardly-projecting studs 34, as can best be seen in FIGS. 2 and 4. It should be noted however that in FIG. 4 the rotating mixing member 36 has been displaced 45° from the position shown in FIG. 2, for purposes of clarity. The rotating mixing member 36 includes 4 rows of axially, uniformly spaced vanes 38 which extend radially outward from the central backbone 40, and are arranged so as to pass between the studs 34.

Preferably, the heads of the studs 34 conform to the frusto-conical bores in the sleeve 32 which may then be press fit into the member 22. It may be desirable to braze or weld over the heads of the studs 34 to insure that they are positioned solidly with respect to the sleeve 32, and it may alternatively be desired to braze or weld the sleeve 32 into the member 22 rather than relying on a press fit. In either case, the axial alignment of the sleeve and stud assembly is important in relationship to the bearing surface 42, at the output end of the mixing chamber, to be sure that there is no interference between the mixing vanes 38 and the studs 34. For this reason, it is preferable that hollow member 22 be a single piece, rather than having the tubular portion surrounding sleeve 32 as one piece and portion 26 as a separate piece.

It should be clearly understood that the adhesive gun of the present invention is in no way dependent upon the particular mixing device which is used for mixing the reactive components. It is not even strictly necessary that the mixing occur by means of meshing mixing elements in which one is stationary and the other rotates, although such an arrangement seems preferable.

Body member 60 is shown as being threadedly connected to the chamber portion 20 by means of threads on the outside of hub portion 62. Body portion 60 defines a central bore 64 through which passes a shaft 66 for the purpose of driving rotating mixing member 36, to which the shaft 66 is connected by any one of a number of well-known means such as the four lugs 68, with one positioned on each side of each vane 38, at the input end of the rotating mixing device 36.

The primary purpose of body portion 60 is to provide (1) means for sealing the end of chamber portion 20 so that no air can enter the mixing chamber; (2) alignment means for the rotating mixing member; (3) locating and attaching means for the lines carrying the various components; and (4) passageways between the incoming lines and the mixing chamber. The arrangement of valves and passages can best be seen by looking at FIG. 3 in conjunction with FIGS. 2 and 1 (with the valve 100 cut-away so as not to hide shaft 66). By way of example, ball valve 100, which in the subject embodiment is connected to the catalyst (or hardener) line, is threaded into orifice 102, which intersects at right angles bore 104, which in turn feeds passageway 106, emptying into the mixing chamber. The bore 104, is preferably drilled inwardly from surface 108, and must be capped during operation of the gun, such as by a threaded plug similar to plug 119 capping bore 114 in FIG. 3. In addition to valve 100 for the hardener, there is also a valve 110 for the resin (or base), a valve 120 for the solvent, and a valve 130 for air. It should be apparent that within the scope of the present invention, more than two reactive components can be mixed by adding another valve and passage arrangement similar to that described above for the catalyst (valve 100).

For simplicity, the drive means for turning shaft 66 and rotating mixing member 36 is not shown, and it should be clearly understood that the invention in no way depends upon the particular type of drive used. Probably the most convenient and economical drive is an air motor, either connected directly to the shaft 66, and mounted on body member 60 or positioned remotely from the adhesive gun and connected to shaft 66 by means of a flexible drive shaft. The choice between the flexible drive shaft and the direct drive may be based upon the viscosity of the materials being mixed, as a flexible shaft may not be able to turn the mixing device 36 through the most viscous materials. Also not shown in the Figures is the apparatus which includes temporary storage tanks for the resin, hardener and flush solvent, as well as the pumping apparatus for each. With the mixing gun of the present invention, any one of a number of commercially available storage and pumping systems may be used. Whereas the complexity of the prior art mixing guns limited the viscosity of the reactive components, the adhesive gun of the present invention does not present such a limitation and the viscosity of the reactive components is now limited only by the pumping capability of the container-and-pumping system.

Figure 5:
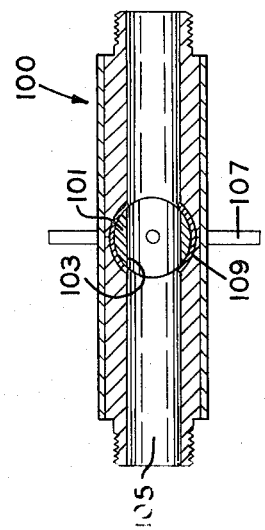
FIG. 5 is an enlarged cross-section of a typical ball valve used with the present invention.

In order to obtain the maximum benefit from the smooth, free-flowing design of the adhesive gun of the present invention, the valves, and especially resin valve 110 and catalyst valve 100 are preferably of the type shown in FIG. 5. Merely by way of example, the illustrated valve is indicated as being the catalyst valve 100. The valve 100 includes a ball 101 which can move only by rotation about its major diameter, perpendicular to the plane of the figure. The ball 101 defines a preferably cylindrical bore 103 which, in the operating position shown in FIG. 5 is axially alligned with, and substantially the same size as, the valve bore 105. Thus, the valve 100 present a generally smooth-walled, continuous path of flow for the material. In addition to the ball bore 103 and valve bore 105 being the same diameter, it is preferable that the incoming resin line and hardener line, as well as the bores and passages through body portion 60, have the same diameter also, so that no part of the flow path presents a restriction to the flow of material.

The ball 101 may be rotated by means of valve handle 107, pivotally attached to ball 101. For simplicity, no handles are shown on the valves in the other figures, although it will be apparent that some form of actuation means is needed for the valves. The ball 101 may have a seal 109 between the ball and its seat, the seal being made from a material such as that sold by du Pont under the trademark TEFLON.

Referring again to chamber portion 20, and body portion 60, both parts can be machined from tool steel or cold-rolled steel, but preferably, aluminum may be used to reduce the weight of the gun, especially if it is to be hand-held by an operator. The same basis for material selection applies to the internal mixing parts.

Operation

As was mentioned previously, the container and pumping system usable with the present invention may be any of those commercially available and capable of generating sufficient pumping force. The pumping system should preferably be arranged such that the pump for the resin and the pump for the hardener are actuated and de-actuated together. The control means for the pumps may be a valve or a switch located either at the pumps or somewhere on the adhesive gun itself. In operation, the valve handles for both the resin (handle not shown) and the hardener (handle 107) are turned to the open position illustrated in FIG. 5 and the resin pump, hardener pump and drive means for shaft 66 can then be actuated, possibly by a single actuation means. The resin flows through valve 110, orifice 112, bore 114 and passage 116 (not shown), and into the mixing chamber 30, while simultaneously, the hardener flows through valve 100, orifice 102, bore 104, passage 106 and into mixing chamber 30. Up to this point, neither reactive component has encountered anything to obstruct its smooth flow path. The two reactive components are then combined as a homogeneous mixture in the mixing chamber as previously discussed, and expelled through nozzle 28. Each of the reactive components, as well as the mixture of the two is forced through the line, the valves, the body portion, the mixing chamber and the nozzle solely by the force of the pumps.

When a sufficient amount of the adhesive (or other material) has been mixed and dispensed, the resin and hardener pumps may be de-actuated to stop the flow of materials and the drive means for shaft 66 can also be turned off while the operator moves to the next work station, or until the next set of pieces to be bonded is brought to the operator. If the adhesive gun will be operated again within a period of time which is found experimentally to be less than the set-up time of the mixture, valves 100 and 110 can be left open. If the time lapse before the next use of the gun is greater than the set-up time, however, valves 100 and 110 should be closed and the gun flushed as will be described subsequently. Depending upon the proposed use for the mixing gun, it may be desirable to eliminate the valves 100, 110 for the hardener and resin, respectively, so that the mixing chamber is permanently in open communication with the storage containers for the resin and hardener. If this is done, however, it may be desirable to provide a quick-connect-disconnect between each line and the mixing gun to facilitate cleaning without getting air and solvent into the resin and hardener lines.

Cleaning

Cleaning the adhesive gun of the present invention can involve either flushing quickly with a solvent such as methylene chloride, then drying with air, or disassembly of the gun and thorough cleaning of the parts in a bath or container of the solvent. In the situation described above wherein the gun will not be operated for a period of time greater than the set-up time of the material, the gun should be flushed with solvent by first closing the resin valve 110 and the hardener valve 100 to prevent either the solvent or air from getting into the lines and mixing with the reactive components. Next, methylene chloride or some other suitable solvent is admitted into the mixing gun by opening valve 120 (see FIG. 1) to a position such as is illustrated in FIG. 5. The methylene chloride then passes through orifice 122, bore 124 and passage 126 (not shown), then into mixing chamber 30. As the solvent passes through the mixing chamber under the force of its pump, the mixing device 36 may preferably be made to rotate, to aid in thoroughly cleaning the adhesive mixture out from between the studs 34 and mixing vanes 38. During flushing it is of course necessary to have a container near the nozzle to collect the mixture of solvent and dissolved adhesive material expelled from the gun. After about 5 or 10 seconds of flushing, substantially all of the adhesive should be out of the mixing chamber, so that only solvent is coming out of the gun. When this occurs, solvent valve 120 should be closed and air valve 130 opened to allow air to pass through orifice 132, bore 134, passage 136 (see FIG. 2), and through mixing chamber 30, to dry the solvent remaining in the mixing chamber. The gun can then be left in this clean, shut-down condition (i.e., all four valves closed), for a relatively long period of time before recommencing use of the gun. What is meant by a long period of time depends upon the particular materials being used, but it would be common practice for the operator to leave the gun in the shut-down position described during a half-hour or hour lunch period, whereas it would normally be necessary to disassemble and clean the gun after it has been out of use overnight or for an entire work shift.

Figure 3:
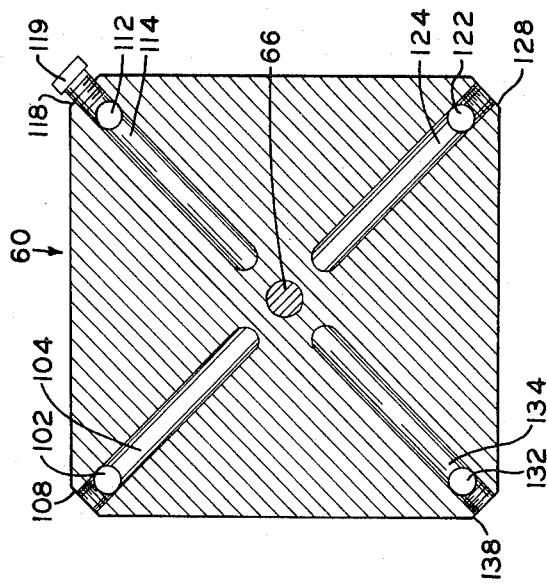
FIG. 3 is a cross-section, taken on line 3—3 of FIG. 2.

It can be readily appreciated from viewing FIGS. 2, 3 and 5 that because of the smooth flow path through the valves and passageways of the body portion 60, the flow paths for the resin and hardener are kept relatively clean merely by the normal operation of the gun. Therefore, instead of totally disassembling the gun and soaking all of the various parts, valves, springs, etc. as has been done with the prior art mixing guns, it is possible to thoroughly clean the adhesive gun of the present invention periodically (such as during a shift when the gun is not being used), by unthreading the chamber portion 20 from the body portion 60. When this is done, the mixing device 36 will become disengaged from the lugs on the end of shaft 66, and the two pieces so removed, the member 22 and the mixing device 36 can then be thoroughly cleaned by soaking them in a solvent such as the methylene chloride used to flush the gun. While merely flushing the gun will almost always keep it sufficiently clean for normal operation, it should be noted that in the event particles do build up in the mixing chamber, the simplified design and construction of the subject embodiment permits disassembly, removal of the particles, and reassembly within as little as 30 seconds to a minute.

While the adhesive gun of the present invention is normally intended for use as a portable, hand-held mixer and dispenser, with the resin and the hardener containers and pumps preferably mounted on a portable dolley, it should be clearly understood that it is within the scope of the present invention to mount such a mixing gun as a permanent part of a semi-automated or fully-automated assembly jig or fixture. If such an arrangement were desired, the mixing gun may be fixed to a movable arm, which can automatically follow any desired bead pattern, with the actuation means for the resin and hardener pumps and the drive means for the mixing device being operated as part of an automatic cycle. In addition, the solvent flushing procedure for the gun could occur periodically (for example, once every four cycles), during the curing portion of the bonding cycle when the gun is not mixing and dispensing.

Thus, it is apparent that the present invention provides a mixing gun in which the flow path of each of the reactive components, as well as of the mixed adhesive, is relatively short, and has a minimum of obstructions and discontinuities to cause the flowing material to plug the passageways or leave a partial build-up. Also, the present invention provides a mixing gun which can be readily cleaned by flushing with solvent, without disrupting the use of the gun, or necessitating disassembly of the gun, removal of lines or temporary connection of other lines.

While the invention has been described in great detail sufficient to enable one of ordinary skill in the art to make and use the same, alternatives and modifications of the preferred embodiment will occur to others upon a reading of the specification. It is intended that all such alternatives and modifications be included within the present invention in so far as they come within the scope of the appended claims.

What is claimed is:

1. Apparatus for mixing a first reactive component and a second reactive component and applying the mixture, said apparatus consisting essentially of:
   a. an elongated hollow member having an input end and an output end, said member defining a mixing chamber and terminating in a nozzle at said output end;
   b. mixing means located within said hollow member and acting in cooperation therewith such that, after the first and second reactive components pass through said hollow member under pressure, the reactive components comprise a generally homogeneous mixture;
   c. a body member fixedly mounted to said input end of said hollow member and adapted to have a plurality of valves mounted thereto;
   d. a first valve and a second valve mounted on said body member, said first valve having an inlet bore and a pressurized source of the first reactive component connected thereto, said second valve having an inlet bore and a pressurized source of the second reactive component connected thereto;
   e. each of said valves having an outlet bore in permanent, open communication with said mixing chamber, by means of a passage-way through said body member.

2. The apparatus of claim 1 wherein said mixing means is rotatably mounted within said mixing chamber and is driven by an external drive means connected to said mixing means by a sealed shaft, such that substantially no air is allowed to enter said mixing chamber during mixing.

3. The apparatus of claim 1 including a third valve mounted on said body member, having an inlet bore and a pressurized source of a solvent fluid connected thereto, said third valve having an outlet bore in permanent, open communication with said mixing chamber, by means of a passageway through said body member, whereby said mixing chamber can be flushed with said solvent fluid without disassembling any portion of said apparatus and without the necessity of temporarily attaching additional lines or equipment to said apparatus.

4. The apparatus of claim 1 wherein said valves are ball valves in which the ball defines a cylindrical bore, of substantially the same diameter as said inlet bore and said outlet bore such that the valve provides a generally smooth-walled, continuous path of flow for the reactive component.

5. The apparatus of claim 4 wherein said valves are operable to have said cylindrical bore oriented axially with said inlet bore and said outlet bore and maintain said orientation as the reactive component is intermittently pumped through said valve.

6. In a method of mixing a first reactive component and a second reactive component and dispensing the resulting highly viscous polymer mixture, the method including pumping the first reactive component from a first storage container to the mixing gun, pumping the second reactive component from a second storage container to the mixing gun, admitting the first and second reactive components into the mixing gun, mixing the reactive components and dispensing the polymer mixture, the improvement comprising:
   a. providing a first connecting means such that the first storage container is in open communication with the mixing gun;
   b. providing a second connecting means such that the second storage container is in open communication with the mixing gun;
   c. simultaneously actuating the pumping means on the first storage container and the pumping means on the second storage container, thereby forcing the first and second reactive components directly into the mixing gun; and
   d. simultaneously de-actuating the pumping means on the first storage container and the pumping means on the second storage container when the desired amount of the polymer mixture has been dispensed.

7. The improvement of claim 6 wherein said first connecting means includes a first ball valve and said second connecting means includes a second ball valve, each of said valves including a ball having a bore of substantially the same diameter as, and aligned axially with the valve bore.

8. The improvement of claim 7 wherein the mixing gun is connected to a pressurized source of a fluid, in which the polymer mixture is soluble, by a third connecting means including a third valve, in the closed position, said improvement including the additional steps of:
   e. closing said first ball valve and said second ball valve;
   f. moving said third valve to the open position, thereby admitting the solvent fluid into the mixing gun under pressure, dissolving substantially all of the polymer mixture remaining in the gun, and expelling the dissolved polymer mixture and solvent from the mixing gun, whereby the gun is clean and ready for subsequent use without disassembling any portion of the mixing gun or connecting temporary lines thereto.

9. An airless mixing gun especially suited for mixing and dispensing the first and second reactive components of a high viscosity, urethane-based adhesive, said mixing gun consisting essentially of:
   a. an elongated hollow member having an input end and an output end, said member defining a mixing chamber and terminating in a nozzle at said output end;

b. mixing means located within said hollow member and acting in cooperation therewith such that, after the first and second reactive components pass through said hollow member under pressure, the reactive components comprise a generally homogeneous mixture;

c. a body member adjacent the input end of said hollow member, adapted to have a plurality of valves mounted thereto;

d. a first valve and a second valve mounted on said body member, each of said valves including a valve bore and a ball defining a bore of substantially the same diameter as said valve bore;

e. said body member defining a passage interconnecting each of said valves and said mixing chamber such that each of said valves is in permanent, open communication with said mixing chamber.

10. The mixing gun of claim 9 including a third valve mounted on said body member, in permanent, open communication with said mixing chamber and adapted to be fixedly connected to a pressurized source of a solvent fluid.

11. Apparatus for mixing a plurality of reactive components and applying the mixture, said apparatus consisting essentially of:
a. an elongated hollow member having an input end and an output end, said member defining a mixing chamber and terminating in a nozzle at said output end;

b. mixing means located within said hollow member and acting in cooperation therewith such that, after the reactive components pass through said hollow member under pressure, the reactive components comprise a generally homogeneous mixture;

c. a body member fixedly mounted to said input end of said hollow member and adapted to have a plurality of valves mounted thereto; and d. a plurality of valves mounted on said body member, each of said valves having an inlet bore and a pressurized source of one of the reactive components connected thereto and each of said valves having an outlet bore in permanent, open communication with said mixing chamber, by means of a passageway through said body member.

12. The apparatus of claim 11 including a flush valve mounted on said body member, having an inlet bore and a pressurized source of a solvent fluid connected thereto, said flush valve having an outlet bore in permanent, open communication with said mixing chamber, by means of a passageway through said body member, whereby said mixing chamber can be flushed with said solvent fluid without disassembling any portion of said apparatus and without the necessity of temporarily attaching additional lines or equipment to said apparatus.

13. The apparatus of claim 11 wherein said valves are ball valves in which the ball defines a cylindrical bore, of substantially the same diameter as said inlet bore and said outlet bore such that the valve provides a generally smooth-walled, continuous path of flow for the reactive component.

14. The apparatus of claim 11 wherein said valves are operable to have said cylindrical bore oriented axially with said inlet bore and said outlet bore and maintain said orientation as the reactive component is intermittently pumped through said valve.

* * * * *